(12) United States Patent
Gancet et al.

(10) Patent No.: US 6,900,171 B1
(45) Date of Patent: May 31, 2005

(54) POLYACRYLATES WITH IMPROVED BIODEGRADABILITY

(75) Inventors: Christian Gancet, Lons (FR); Rosangela Pirri, Montardon (FR); Bernard Boutevin, Montpellier (FR); Cédric Loubat, Grabels (FR); Jean Lepetit, Allauch (FR)

(73) Assignee: Arkema, Puteaux (FR)

( * ) Notice: Subject to any disclaimer, the term of this patent is extended or adjusted under 35 U.S.C. 154(b) by 0 days.

(21) Appl. No.: 09/701,681

(22) PCT Filed: Jun. 1, 1999

(86) PCT No.: PCT/FR99/01279

§ 371 (c)(1),
(2), (4) Date: Jun. 1, 2001

(87) PCT Pub. No.: WO99/62971

PCT Pub. Date: Dec. 9, 1999

(30) Foreign Application Priority Data

Jun. 3, 1998 (FR) ............................. 98 06939

(51) Int. Cl.⁷ ......................... C08F 220/04; C11D 3/37
(52) U.S. Cl. ....................... 510/475; 510/434; 510/476; 510/477; 510/488; 510/533; 525/10
(58) Field of Search ................................ 510/434, 475, 510/476, 477, 488, 533; 525/10

(56) References Cited

U.S. PATENT DOCUMENTS

| 4,923,941 A | * | 5/1990 | Bailey ........................ 526/268 |
| 5,318,719 A | | 6/1994 | Hughes et al. ......... 252/174.23 |

FOREIGN PATENT DOCUMENTS

| DE | 19 20 850 A | | 11/1969 | |
| DE | 21 25 461 A | | 12/1971 | |
| EP | 0 430 574 A | | 6/1991 | |
| EP | 0 497 611 | | 8/1992 | ......... C08F/220/04 |
| EP | 497611 | * | 8/1992 | ......... C08F/220/04 |
| GB | 1260515 | * | 1/1972 | ............ C11D/1/00 |
| JP | 43-25981 | | 11/1968 | |
| JP | 06-116592 | | 4/1994 | |
| JP | 07-164000 | | 6/1995 | |
| JP | 7164000 | * | 6/1995 | ........... C02F/11/14 |
| JP | 07-228889 | | 8/1995 | |

OTHER PUBLICATIONS

Swift, "Water–Soluble Polymers", Polymer Degredation and Stability 45, pp. 215–231, 1994 (no month given).*
"Water–soluble polymers", Swift, Polymer Degradation and Stability 45, 215–231, 1994, no month given.
"Molecular design of biodegradable functional polymers, 4ᵃ⋅ Poly(vinyl alcohol) block as biodegradable segment", Macromol. Chem. Phys. 196, No. 11, 3437–3445, 1995, Nov. 1995.
"Ecological Assessment of Polymers", Hamilton J.D., Sutcliffe Ro, Ed. Van Nostrand—Rheinhold, 1997, Swift, pp. 291–307, no month given.
International Search Report for PCT/FR99/01279 dated Aug. 19, 1999 (PCT/ISA/210).

* cited by examiner

Primary Examiner—Brian P. Mruk
(74) Attorney, Agent, or Firm—Smith, Gambrell & Russell, LLP

(57) ABSTRACT

A hydrophilic polymer with improved biodegradability and particular usefulness in detergent compositions contains units derived by polymerization from at least one monomers A bearing a carboxylic acid function or an equivalent function, units derived by polymerization from at least one monomers B bearing an electron-rich group or a function capable of introducing an electron-rich group into the main chain, and, optionally, units derived by polymerization from at least one monomers C which is copolymerizable with A and B, but is different from A and B. Examples of suitable monomers as monomers A include maleic anhydride, acrylic acid, methacrylic acid, itaconic acid, fumaric acid and maleic acid, and the salts thereof. Examples of suitable monomers as monomers B include butadiene, isoprene, chloroprene, dimethylbutadiene, cyclohexadiene, butadienecarboxylic acid, butadienedicarboxylic acid, acetylene, acetylenecarboxylic acid and acetylenedicarboxylic acid. Suitable monomers as monomers C include vinyl, acrylic and styrene monomers and derivatives thereof.

15 Claims, No Drawings

POLYACRYLATES WITH IMPROVED BIODEGRADABILITY

The invention relates to biodegradable polymers and in particular to polyacrylates with improved biodegradability.

The polyacrylates of the invention can be used in various applications and in particular in detergent compositions.

In general, detergent compositions involve a certain number of chemical products. These should be biodegradable so as not to harm the environment. Detergent compositions and cleaning agents conventionally contain phosphates. These are highly effective and relatively non-toxic, but cause eutrophization of natural aquatic media.

Phosphates have been partially replaced in detergent formulations by polymers such as polyacrylic acides or copolymers based on acrylic acid and on maleic anhydride.

Although the polyacrylates currently used do not pose this problem, their absence of rapid biodegradability causes an accumulation in the natural environment (Swift, Polymer Degradation and Stability, 45, 215–231, 1994).

No toxicity associated a priori with these polymers is known, but their long-term effect is uncertain, and this uncertainty has contributed towards the instigation of numerous research studies intended to improve their biodegradability.

It is clearly established that hydrophilic polymers, such as polyvinyl alcohol, are rapidly degraded by microorganisms (Macromol. Chem. Phys. 196, 3437, 1995). It is also known that polyacrylic acids with an average molecular weight of less than 1000 have better biodegradability than their higher homologs (Swift, Ecological Assessment of Polymer 15, 291–306, 1997).

EP 0 497 611 discloses the preparation of biodegradable terpolymers and of compositions containing them. These terpolymers are based on vinyl acetate, acrylic acid and maleic anhydride. They have weight-average molecular masses of less than 20 000.

U.S. Pat. No. 5,318,719 discloses a novel class of biodegradable materials based on the grafting of polymers containing acidic functions onto a polyoxyalkylene-based biodegradable support.

Other studies indicate that chains comprising hetero atoms are more readily degraded than carbon-based chains. Thus, U.S. Pat. No. 4,923,941 discloses biodegradable copolymers containing carboxylic acid functions and heterocycles, as well as the detergent compositions containing them.

The Applicant has now found that the degradability of the polymers described above can be improved by inserting sites of fragility into the main chain. These sites will be rapidly broken by the microorganisms of the natural environment, to give acrylic blocks that are small enough in mass to be readily biodegradable.

The Applicant has found that the insertion of electron-rich centres, such as double bonds, into an acrylic chain makes the acrylic chain more fragile with respect to microorganisms and thus improves its biodegradability.

It is moreover well known that although carbon-based chains are highly chemically and biologically resistant, this is true only in the case of saturated chains. The reason for this is that if a chain comprises multiple bonds (electron-rich), these readily oxidizable and chemically reactive bonds will constitute the first sites of cleavage of the molecule. Among the multiple bonds, carbon-carbon double bonds appear to be the ones most readily usable.

The invention relates to hydrophilic polymers with improved biodegradability, in particular polyacrylates containing readily oxidizable electron-rich sites.

The polymers of the invention contain:
- from 70% to 99% by weight of units derived by polymerization from at least one monomers A bearing a carboxylic acid function or an equivalent function,
- from 1% to 30% by weight of units derived by polymerization from at least one monomers B bearing an electron-rich group or a function capable of introducing an electron-rich group into the main chain,
- from 0% to 29% by weight of units derived by polymerization from at least one monomers C which is copolymerizable with A and B, but is different from A and B.

They can also contain a chain-limiting transfer agent.

Irrespective of the monomers A, B and C, the final polymer should remain hydrophilic.

The monomers A is chosen from the group consisting of monomers bearing at least one carboxylic acid and derivatives thereof, such as acid salts and anhydrides. As a non-limiting guide, mention may be made of maleic anhydride, acrylic acid, methacrylic acid, itaconic acid, fumaric acid and maleic acid, and the salts thereof.

The monomers A which is preferred according to the invention is acrylic acid.

The monomers B is chosen from the group consisting of:
- monomers bearing two conjugated double bonds, such as butadiene, isoprene, chloroprene, dimethyl-butadiene, cyclohexadiene, butadienecarboxylic acid and butadienedicarboxylic acid, and
- monomers bearing a triple bond, such as acetylene, acetylenecarboxylic acid and acetylenedicarboxylic acid.

The preferred monomers B of the invention is isoprene.

The monomers C, which is different from A and B, is chosen from the group containing monomers that are copolymerizable with A and B, such as vinyl, acrylic and styrene monomers, and derivatives thereof.

The distribution in the final polymer of the fragile sites provided by the monomers B depends both on the intrinsic relative reactivity of the various monomers present and on the ratio of the relative concentrations of monomers A, monomers B and optionally other monomers C.

The polymers of the invention may be linear or branched. They may also be partially crosslinked.

Polyacrylic acids partially neutralized and crosslinked with the aid of a molecule containing at least two functions that are reactive with carboxylic acids and containing the fragile sites described above constitute a perfect example of branched polymers with improved biodegradability according to the invention.

Among these polymers, mention may be made of the products generally used as aqueous-liquid absorbing agents and often referred to as superabsorbents (SAPs).

The polymers of the invention may be obtained by the joint polymerization of:
- 70% to 99% by weight of at least one monomers A,
- 1 to 30% by weight of at least one monomers B, and
- 0% to 29% by weight of at least one monomers C.

The monomers A, B and C are those described above.

The polymerization may be carried out in solution in an organic solvent or in the presence of water. As a guide, these two modes of synthesis are described for the production of a linear product:

in the presence of organic solvent:

The polymerization takes place in tetrahydrofuran (THF). When the polymerization is performed batchwise, the monomers mixture is introduced into the solvent along with the initiator (azobis-isobutyronitrile, AIBN) and, where appropriate, a transfer agent such as thioglycolic acid (TGA) or another thiol.

After degassing and placing under nitrogen, the reaction is initiated by raising the temperature to 70° C.

The monomers A, B and C, if used, may be introduced continuously with the aid of a metering pump into the reactor throughout the reaction, with the aim of better distributing the functional monomers throughout the chain and of thus obtaining a polymer of more uniform composition.

After reaction and concentration of the THF on a rotary evaporator, the polymer is precipitated and dried in an oven under vacuum.

in the presence of water:

The monomers mixture, the initiator (potassium persulphate, $K_2S_2O_8$) and, where appropriate, a transfer agent such as thioglycolic acid (TGA) or another thiol, are introduced into the water.

After degassing and placing under nitrogen, the reaction is initiated by raising the temperature to 70 or 80° C.

After polymerization, the product is recovered by evaporation and drying under vacuum.

The biodegradability of the products obtained is examined in the following way:

Evaluation of the biodegradability

Oxidative prescreening

This test is intended to evaluate the sensitivity of the new sequences to the action of oxidative degradation of microbial enzymes.

Given that the oxidative enzymes are neither easy to use nor commercially available, the test method described below uses metal complexes, which are analogs of oxidative enzymes, and in particular TPEN N,N,N',N' tetramethylpyridine-1,2-ethylenediamine or N,N,N',N'-tetrakis(2-pyridylmethyl)ethane-1,2-diamine.

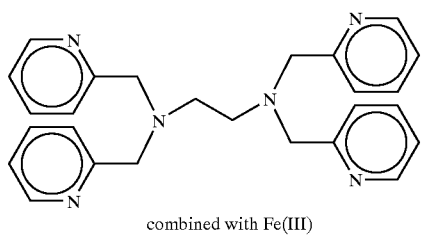

combined with Fe(III)

The reaction conditions used for the degradability test are as follows:

| Polymers to be tested | 1 mg/ml |
| --- | --- |
| | (test volume = 10 ml) |
| TPEN combined with Fe(III) | 0.05 mM |
| Free TPEN | 0.5 mM |
| $H_2O_2$ | 100 mM |
| pH | 7 |
| Temperature | 50° C. |
| Time | 4 h |

The evaluation of the level of degradation obtained is made by liquid chromatography under the following conditions:

| Column | Tosohaas TSK 3000 |
| --- | --- |
| Eluent | 0.1 M $H_3CCOONa$ |
| Flow rate | 0.5 ml/min. |
| Injection | 25 µl after 0.22µ filtration |
| Detection | Differential refractometer |
| Data acquisition | Dionex Peaknet |

The column is calibrated by means of polyacrylate standards (Polymer Laboratories).

The degradability of the polymer under the test conditions is measured by the shift of the peak observed in liquid chromatography towards lower molecular masses.

This shift is quantified by means of a degradability index $I_{1000}$ defined in the following way:

| Initial mass of the polymer | Mi |
| --- | --- |
| Final mass of the polymer | Mr |
| Number of cleavages | Nc |
| Initial degree of polymerization | $Dp = \dfrac{Mi}{Mmono}$ | with $M_{mono}$: "average" mass of the monomers degradability index:

$$I_{1000} = \frac{Nc}{Dp} \times 1000$$

i.e.:

$$I_{1000} = \left(\frac{Mi}{Mr} - 1\right) \times \frac{Mmono}{Mi} \times 1000$$

Microbiological Degradation

Experimental Cultures

Candida tropicalis cultures are prepared on a liquid medium comprising malt extract (20 g.l$^{-1}$) and incubated at 30° C. with axial agitation for 48 hours.

These cultures are centrifuged at 18 000 rpm for 15 minutes and the pellet is washed with 0.1 M pH6 phosphate buffer and is recentrifuged a described above. The latter operation is carried out a second time in order to effectively remove any residual substrate.

Warburg Method

The evaluation of the respiration of C. tropicalis on a polyacrylate is carried out in Warburg flasks (total volume of 3 ml) comprising 1.3 ml of 0.1 M pH6 phosphate buffer, 1 ml of yeast suspension (about 3 mg dry weight) and 0.5 ml of polyacrylate at 1.12 g/l$^{-1}$ (final concentration of 200 ppm).

Control tests are carried out in parallel:

a flask containing only phosphate buffer (2.8 ml) allows the atmospheric pressure variations to be measured the endogenous respiration is measured in a flask containing only phosphate buffer (1.8 ml) and the yeast suspension (1 ml)

the respiration due to contaminants which may be present in the acrylate solution is also evaluated by a test comprising the acrylate (0.5 ml) and the phosphate buffer (2.3 ml).

The flasks are agitated in a water bath at 30° C.

Measurements of the pressure variations due to the appearance of $CO_2$, which is indicative of the metabolism of the acrylate by the yeast, are carried out every 15 minutes.

Cultures of *C. tropicalis* on Polyacrylate

Two types of culture are carried out: cultures exclusively comprising polyacrylate as carbon source and cultures combining yeast extract. The first case makes it possible to indicate the use of the compound by the microorganism. The second case is directed towards optimizing this use in order to increase the degradation efficiency by promoting the growth of the yeast.

In both cases, these media comprise a conventional mineral medium (MgSO$_4$.7H$_2$O g; CaCl$_2$ 2H$_2$O 0.1 g: NaCl 1 g; FeSO$_4$.7H$_2$O 0.1 g; ZnSO$_4$.7H$_2$O 0.1 g; CoCl$_2$ 0.1 g; CuSO$_4$.5H$_2$O 10 mg; AlK (SO$_4$)$_2$.12H$_2$O 10 mg; H$_3$BO$_3$ 10 mg; Na$_2$MoO$_4$.2H$_2$O 2 mg; qs 1 l distilled water) combined with 0.1 M pH6 phosphate buffer in proportions of 2/98. The polyacrylate is at a final concentration of 500 ppm.

The yeast extract which may be added has a final concentration of 200 ppm this concentration may be increased up to 500 ppm if the growth remains too little. The flasks are incubated at 30° C. with transverse agitation and are subculture after one week. The cultures are then continued for 15 days under the same conditions.

Evaluation of the Calcium-complexing Ability

The principle of this test consists in measuring the ability of a given polymer to prevent the formation of a precipitate of CaSO$_4$ from sodium sulphate and calcium chloride.

The protocol used is as follows:

Two aqueous solutions are prepared starting with distilled water, to contain the following salts:

| | |
|---|---|
| Solution A: CaCl$_2$.2H$_2$O | 64.9 g/l + MgCl$_2$ 0.5 g/l |
| Solution B: Na$_2$SO$_4$ | 62.7 g/l |

400 ml of distilled water are introduced into a 500 ml flask and 50 ml of solution A is gradually added thereto, with agitation, followed by 50 ml of solution B. In a flask serving as control, nothing else is added, while a certain amount of antitartar agent is added to the other two flasks. At time t=0, after homogenization of the solutions, a few ml of solution are taken and the calcium and magnesium therein are assayed. The flasks are stoppered and then left to stand for 7 days. A few ml of supernatant liquid are then taken and the calcium and magnesium are re-assayed.

The ion concentration is measured by emission spectrometry using the ICP (Inductively Coupled Plasma) technique.

The results obtained are expressed as ppm of calcium in the solutions at time 0 and after 7 days of contact.

The examples which follow illustrate the invention without limiting its scope.

EXAMPLE 1 (COMPARATIVE)

Acrylic Acid (AA)/Vinyl Monomers Copolymer in Solvent Phase 50 ml of tetrahydrofuran (THF), 5.76 g of acrylic acid, 0.98 g of maleic anhydride, 2 g of ethylene glycol vinyl ether (EGVE) and 0.296 g of azo-bis-isobutyronitrile (AIBN) are introduced into a 100 ml two-necked round-bottomed flask fitted with a condenser and a nitrogen inlet.

The reaction mixture is degassed by a succession of vacuum and nitrogen cycles and is then placed in an oil bath thermostatically maintained at 70° C.

After reaction for 12 hours the reaction mixture is concentrated on a rotary evaporator and then precipitated (twice) filtered (sinter 5) and dried in an oven under vacuum (5×10$^{-2}$ bar) for a minimum of six hours.

| | Results | | | | |
|---|---|---|---|---|---|
| Ref. | Composition | T° C. | Transfer agent | Initiator | I$_{1000}$ |
| BG 78 | AABO/AM10/EGVE10 | 68 (reflux) | No | AIBN | 56 |

Oxidative Degradability

Under the test conditions, the product obtained has a degradability index I$_{1000}$ of 56, this result being higher than that of the reference polyacrylates, whose I$_{1000}$ is between 18 and 26 under the same conditions.

Similarly, a commercial copolymer of methyl vinyl ether and of maleic anhydride, Gantrez, has an I$_{1000}$ of 46.5, which clearly confirms the biodegradability of the polycarboxylic-vinyl copolymers.

Finally, a polyvinyl alcohol homopolymer with very good biodegradability has an I$_{1000}$ of 212.1, which may thus be considered as the upper limit under the test conditions.

EXAMPLE 2

AA/Isoprene Copolymer in Solvent Phase

1. Batchwise Synthesis at the Reflux Point of the Solvent (68° C.)

20 ml of tetrahydrofuran, 2.88 g of acrylic acid, 0.68 g of isoprene, 0.082 g of AIBN and 0.131 g of thioglycolic acid (TGA) as transfer agent, if necessary, are introduced into a 100 ml Schlenck tube.

The reaction mixture is degassed by a succession of vacuum and nitrogen cycles and is then placed in an oil bath thermostatically maintained at 70° C.

After reaction for 12 hours, the reaction mixture is concentrated on a rotary evaporator and then precipitated (twice), filtered (sinter 5) and dried in an oven under vacuum 5×10$^{-2}$ bar) for a minimum of six hours.

Two products were prepared according to this method. They have the reference numbers BG 70 and BG 115.

2. Semi-continuous Synthesis in a Reactor Under Pressure (70° C.; 2.5 bar)

0.6 g of AIBN, 33.5 g of acrylic acid and 90 g of THF are introduced into a 500 ml stainless-steel reactor able to withstand a minimum pressure of 5 bar, fitted with a magnetic stirring bar.

The reactor is hermetically closed by a lid with 8 screws, on which is mounted a manometer and a valve which can be used to introduce liquids and to degas the reactor.

The pressure in the reactor is raised to 2.5 bar by introduction of nitrogen.

7.5 g of isoprene and 180 g of THF are weighed into a flask, thermostatically maintained by an ice bath. The filled flask is placed on a balance to monitor the decrease in mass corresponding to the amount introduced into the reactor. The flask is connected to a metering pump, which is itself connected to the reactor. The connecting tubes are purged and the reactor is placed in an oil bath thermostatically maintained at 70° C. and stirred magnetically. There is a risk of the pressure increasing slightly: it should not exceed 5 bar. Introduction of the THF/isoprene mixture into the reactor is then commenced. The addition lasts 180 min and the reaction is maintained at 70° C. for a further 17 hours.

At the end of the reaction, the reactor is placed in an ice bath in order to reduce the internal pressure, and after 30 minutes it is degassed.

The reaction mixture is concentrated on a rotary evaporator and then precipitated (twice), filtered (sinter 5) and dried in an oven under vacuum ($5\times10^{-2}$ bar) for a minimum of six hours.

The product obtained has the reference number CL 56.

Results

| Ref. | Composition | T° C. | Transfer agent | Initiator | $I_{1000}$ |
|---|---|---|---|---|---|
| BG 70 | AA80/Isopr20 | 68 (reflux) | No | AIBN | 48.6 |
| BC115 | AA80/Isopr20 | 68 (reflux) | Yes | AIBN | 62.4 |
| CL 56 | AA80/Isopr20 | 70 | No | AIBN | 50 |

Oxidative Degradability

Under the test conditions, the products obtained have a degradability index $I_{1000}$ of between 48.6 and 68.4, this result being higher than that of the reference polyacrylates, whose $I_{1000}$ is between 18 and 26 under the same conditions. This is confirmed in the presence or absence of a transfer agent. These results show that the degradability of this type of copolymer in the oxidation test is of an entirely equivalent level to that of the structures described in Example 1 corresponding to EP 0 4 97 611.

Microbiological Degradability

The AA/isoprene copolymer (BG70) was moreover evaluated in microbiological degradation under the conditions described above. Two types of results were obtained.

a—Respiration Test

The copolymer was used as carbon substrate for *Candida tropicalis* cultures, compared with readily metabolized control glucose substrate, and with a reference polyacrylate.

The respiration values obtained are as follows:

| Reference | Composition | Respiration, µl $O_2$/h.g of cells |
|---|---|---|
| Glucose | — | 17.3 |
| BG70 | AA80/Isoprene20 | 5.1 |
| Norasol 4500 | AA Homo-polymer | 0 |

Compared with a standard polyacrylate which causes no respiration, the copolymer with isoprene has a specific respiration level of close to 30% of that of glucose, which indicates a marked improvement in biodegradability.

b—Assimilation Test

The copolymer was used as carbon substrate for *Candida tropicalis* cultures of longer duration, and analyzed by liquid chromatography comparatively, after culturing for 15 days.

The analysis of these results shows that about 72.5% of the copolymer was degraded by the microorganism over the 15 days of culture. Washing of the biomass with saline solutions reveals no trace of polymer, which is proof that biodegradation has taken place, rather than adsorption of the polymer thereon.

Complexation

The copolymers obtained are dissolved in 0.1 M sodium hydroxide before analysis, and are then returned to the test pH. The level of calcium measurable after 7 days of contact indicates the ability of the polymer evaluated to inhibit its precipitation in the form of $CaSO_4$. The table below indicates that the effect persists up to 0.25 ppm of AA/isoprene copolymer under the test conditions, and up to a similar value for the reference polyacrylate, whereas no effect is measured for the control.

| Reference | ppm | Content of $Ca^{2+}$ ppm at t = 0 | Content of $Ca^{2+}$ ppm at t = 7 days |
|---|---|---|---|
| BG70 | 0.05 | 2260 | 1590 |
|  | 0.25 | 2290 | 2290 |
|  | 0.5 | 2290 | 2270 |
| Norasol 4500 | 0.1 | 1860 | 890 |
|  | 0.4 | 1780 | 1530 |
|  | 1 | 1790 | 1680 |
| Control |  | 1930 | 940 |

These results make it possible to conclude that the novel AA/isoprene polymers show a power with respect to calcium which is equivalent to that of a reference polyacrylate such as Norasol 4500.

What is claimed is:

1. A hydrophilic polymer with improved biodegradability, comprising:
   from 70% to 99% by weight of units derived by polymerization from at least one monomers A bearing a carboxylic acid function or an equivalent function,
   from 1% to 30% by weight of units derived by polymerization from at least one monomers B bearing an electron-rich group or a function capable of introducing an electron-rich group into the main chain, wherein monomers B is selected from the group consisting of monomers bearing two conjugated double bonds and monomers bearing a triple bond; and
   units derived by polymerization from at least one monomers C which is copolymerizable with A and B, but is different from A and B, the amount of such units being up to 29% by weight, wherein monomers C is selected from the group consisting of vinyl, acrylic, styrene and derivatives thereof.

2. The hydrophilic polymer as claimed in claim 1, wherein the monomers A is chosen from the group consisting of monomers bearing at least one carboxylic acid and derivatives thereof.

3. The hydrophilic polymer as claimed in claim 1, wherein the hydrophilic polymer is crosslinked with a difunctional agent to form a carboxylic polymer which can be used as a superabsorbent.

4. The hydrophilic polymer as claimed in claim 2, wherein monomers A is selected from the group consisting of maleic anhydride, acrylic acid, methacrylic acid, itaconic acid, fumaric acid, maleic acid and the salts of the foregoing.

5. The hydrophilic polymer as claimed in claim 4, wherein the monomers A is acrylic acid.

6. A hydrophilic polymer with improved biodegradability, comprising:
   from 70% to 99% by weight of units derived by polymerization from at least one monomers A bearing a carboxylic acid function or an equivalent function,
   from 1% to 30% by weight of units derived by polymerization from at least one isoprene, and
   units derived by polymerization from at least one monomers C which is copolymerizable with A and isoprene, but is different from A and isoprene, the amount of such units being up to 29% by weight.

7. The hydrophilic polymer as claimed in claim 6, wherein the monomers C is selected from the group consisting of vinyl, acrylic, styrene monomers and derivatives thereof.

8. A hydrophilic polymer with improved biodegradability, comprising:

from 70% to 99% by weight of units derived by polymerization from at least one monomers A bearing a carboxylic acid function or an equivalent function, from 1% to 30% by weight of units derived by polymerization from at least one monomers B, wherein monomers B bears two conjugated double bonds and is selected from the group consisting of butadiene, isoprene, chloroprene, dimethylbutadienie, cyclohexadiene, butadienecarboxylic acid and butadienedicarboxylic acid, and units derived by polymerization from at least one monomers C which is copolymerizable with A and B, but is different from A and B, the amount of such units being up to 29% by weight.

9. A hydrophilic polymer with improved biodegradability, comprising:

from 70% to 99% by weight of units derived by polymerization from at least one monomers A bearing a carboxylic acid function or an equivalent function, from 1% to 30% by weight of units derived by polymerization from at least one monomers B, wherein monomers B bears a triple bond and is selected from the group consisting of acetylene, acetylenecarboxylic acid and acetylenedicarboxylic acid, and units derived by polymerization from at least one monomers C which is copolymerizable with A and B, but is different from A and B, the amount of such units being up to 29% by weight.

10. The hydrophilic polymer as claimed in claim 8, wherein the monomers C is selected from the group consisting of vinyl, acrylic, styrene monomers and derivatives thereof.

11. The hydrophilic polymer as claimed in claim 9, wherein the monomers C is selected from the group consisting of vinyl, acrylic, styrene monomers and derivatives thereof.

12. A detergent composition comprising the hydrophilic polymer of claim 1.

13. A detergent composition comprising the hydrophilic polymer of claim 6.

14. A detergent composition comprising the hydrophilic polymer of claim 8.

15. A detergent composition comprising the hydrophilic polymer of claim 9.

* * * * *